United States Patent
Nelson

[11] 3,957,349
[45] May 18, 1976

[54] IMAGING METHOD
[75] Inventor: Kyler F. Nelson, Pittsford, N.Y.
[73] Assignee: Xerox Corporation, Stamford, Conn.
[22] Filed: July 29, 1974
[21] Appl. No.: 492,580

[52] U.S. Cl. .......................... 350/160 LC; 250/331
[51] Int. Cl.² ............................................ G02F 1/13
[58] Field of Search ............... 350/160 LC; 250/331

[56] References Cited
UNITED STATES PATENTS

| | | | |
|---|---|---|---|
| 3,642,348 | 2/1972 | Wysocki et al. | 350/160 LC |
| 3,652,148 | 3/1972 | Wysocki et al. | 350/160 LC X |
| 3,687,515 | 8/1972 | Haas et al. | 350/160 LC X |
| 3,732,429 | 5/1973 | Braunstein et al. | 350/160 LC X |
| 3,764,211 | 10/1973 | Morse et al. | 350/160 LC UX |
| 3,824,008 | 7/1974 | Smith, Jr. | 350/160 LC X |

*Primary Examiner*—John K. Corbin
*Assistant Examiner*—Matthew W. Koren
*Attorney, Agent, or Firm*—James J. Ralabate; Michael H. Shanahan; George J. Cannon

[57] ABSTRACT

An electro-optic device comprising, in turn, a first electrode, a photoconductive layer, a liquid crystalline layer, and a second electrode, and imaged with background at a voltage $v_o$, is imaged without background by relatively slowly applying $v_o$. Optionally, $v_o$ is relatively slowly reduced to zero to prevent background creation during removal of $v_o$.

15 Claims, 6 Drawing Figures

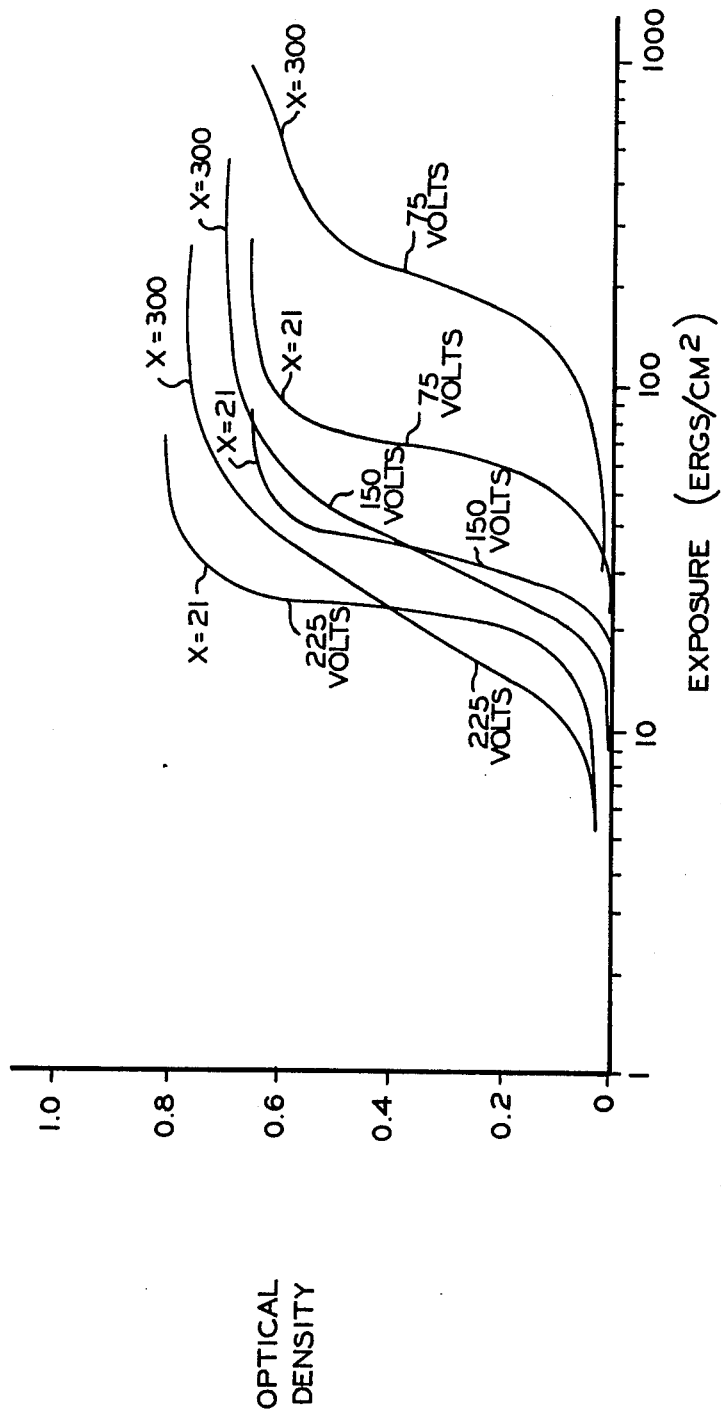
FIG. 5  DENSITY VS. LOG EXPOSURE CURVE FOR 5200 Å LIGHT AT X ERGS-CM$^{-2}$-SEC$^{-1}$

IMAGING METHOD

BACKGROUND OF THE INVENTION

This invention relates to electro-optic devices comprising a photoconductive layer in contact with a liquid crystalline layer; more particularly this invention relates to imaging the device with suppressed premature response by the liquid crystalline layer prior to imaging.

Electro-optic devices comprising a photoconductive layer and liquid crystalline layer are known. Typically, the liquid crystalline layers respond by changing optical characteristics in response to some threshold level of voltage. In imaging, a voltage is applied across both the photoconductive and liquid crystalline layers in an amount insufficient to produce response by the liquid crystalline layer. Imagewise actinic radiation is generally utilized to render the conductor conductive in imagewise configuration. This causes the voltage across the photoconductor to decrease and the voltage across the liquid crystalline layer to increase, in corresponding imagewise configuration. Typically, the voltage increases across the liquid crystalline layer to a level at or above the threshold level of voltage to which the liquid crystalline layer responds thereby causing a changing in optical properties in imagewise configuration.

A difficulty frequently encountered in imaging electro-optic cells comprising a photoconductive layer in contact with a liquid crystalline layer is that prior to imaging, and merely upon applying a voltage to the cell, premature response by the liquid crystalline layers occurs and a significant amount of the liquid crystalline layer is unavailable for imaging and often interferes with subsequently formed images. This difficulty is also often encountered during removal of the applied field after imaging.

The manner in which a voltage is applied to a liquid crystalline layer is of consequence as indicated by U.S. Pat. Nos. 3,503,673; 3,519,330; 3,575,491 and 3,575,493. In general, these patents are directed to the rapid onset and removal of dynamic scattering in electro-optic cells containing nematic liquid crystalline materials but lacking a photoconductive layer.

Improved electro-optic effects are obtained for an electro-optic cell containing a photoconductive layer in contact with a liquid crystalline layer in U.S. Pat. No. 3,732,429 wherein a layer of high electrical impedance is included in the cell. This provides a higher dark impedance to the cell without significantly affecting the light-to-dark impedance ratio so that, upon imaging with actinic light, the contrast between scattered and non-scattered areas of the imaged cell is enhanced.

In new and growing areas of technology, new methods, apparatus, compositions, and articles of manufacture are often discovered for the application of the new technology in a new mode. The present invention relates to a new and advantageous method of imaging an electro-optic cell comprising a photoconductive layer in contact with a liquid crystalline layer.

SUMMARY OF THE INVENTION

It is an object of the invention to provide a novel imaging method.

It is another object to provide a novel method of imaging an electro-optic device comprising a photoconductor in contact with a liquid crystalline layer.

It is still a further object of the invention to minimize, suppress or diminish undesirable transformations in the imaging of the aforementioned electro-optic device.

It is yet a further object of the invention to provide increased optical sensitivity in the imaging of the aforementioned electro-optic device while reducing such undesirable liquid crystalline transformations.

The foregoing object and others are accomplished in accordance with this invention by providing an electro-optic device comprising a photoconductive layer in contact with a liquid crystalline layer, applying a voltage at a rate which maintains the voltage across the liquid crystalline layer at a value less than the threshold value of voltage to which the liquid crystalline layer responds, imaging the device in the conventional manner, and, optionally, decreasing the applied voltage at a rate which maintains the voltage across the liquid crystalline layer at a value less than the threshold value of voltage to which the liquid crystalline layer responds.

It has now been found that when a liquid crystalline layer in contact with a photoconductive layer are substantially instantaneously subjected to a voltage applied by electrodes, such as by throwing a single pole-single throw switch at a time $T_o$, the applied voltage is divided between the photoconductive and liquid crystallline layers on the basis of capicitance for a period of time $T_o$ to $T_n$ and after time $T_n$ the applied voltage is divided between the photoconductive layer and liquid crystalline layer on the basis of resistance.

More particularly, during the time interval $T_o$ to $T_n$ (hereinafter referred to as transitory voltage division) the voltage, $V_1$, across the photoconductor is:

$$V_1 = \frac{V_0 C_2}{C_1 + C_2};$$

the voltage, $V_2$, across the liquid crystalline layer is:

$$V_2 = \frac{V_0 C_1}{C_1 + C_2};$$

where $C_1$ and $C_2$ are the capacitances of the photoconductive and liquid crystalline layers, respectively. This is so whether $V_0$ is D.C. or A.C.

After time $T_n$, the voltage, $V_{1(n)}$, across the photoconductive layer is:

$$V_{1(n)} = \frac{V_0 R_1}{R_1 + R_2};$$

the voltage, $V_{2(n)}$, across the liquid crystalline layer is:

$$V_{2(n)} = \frac{V_0 R_2}{R_1 + R_2};$$

where $R_1$ and $R_2$ are the resistances of the photoconductive and liquid crystalline layers, respectively. The voltage division after $T_n$ is hereinafter referred to as the steady state voltage division. In these formulas $V_0$ is a D.C. voltage. Where $V_0$ is an A.C. voltage the steady state voltage division is based on impedance; the impedances corresponding to the resistances in the same formulas as above yield the A.C. voltage steady state division. The transitory voltage division time period, $T_o$ to $T_n$, is characterized by the circuit time constant, $$\frac{R_1 R_2 (C_1 + C_2)}{R_1 + R_2}.$$

The aforementioned difficulty of premature response by the liquid crystalline layer during the application of voltae is now discovered to be due to the fact that the voltage across the liquid crystalline layer during the transitory voltage division time period exceeds the threshold voltage of response of the liquid crystalline layer.

Similarly, during substantially instantaneous removal of the voltage applied to the electro-optic device the absolute value of the voltage across the liquid crystalline layer often exceeds the threshold voltage of response of the liquid crystalline layer and causes the aforementioned undesired response during voltage removal after imaging.

These undesired reponses are intolerable in images having memory, such as, for example, the Grandjean to focal-conic imagewise texture transformation of a mixture of cholesteric and nematic liquid crystalline materials. These undesired responses are more tolerable in images lacking memory because during the steady state division of applied voltage they tend to disappear. However, since they are visible during the transient voltage division time period these undesired responses are preferably suppressed.

BRIEF DESCRIPTION OF THE DRAWINGS

For a better understanding of the invention as well as other objects and features thereof, reference is made to the following detailed disclosure of the preferred embodiments of the invention taken in conjunction with the accompanying drawings thereof, wherein:

FIG. 5 is a graphical illustration of device sensitivity versus voltage applied.

DESCRIPTION OF THE PREFERRED EMBODIMENTS

The invention herein is described and illustrated in specific embodiments. However, it will be understood by those skilled in the art that the invention can be applied to any device comprising a photoconductive layer in contact with a liquid crystalline layer, both layers being sandwiched between two electrodes, and, that any optical change of a liquid crystalline material which responds to a threshold voltage across the liquid crystalline layer can be employed in the imaging liquid crystalline layer.

Imaging layers and systems suitable for use in conjunction with the method of the present invention include any imaging layer or system which can be imaged by application of a voltage which subjects the layer to either an electrical field; current or charge carrier flow; or the capture of charges such as, for example, that of U.S. Pat. No. 3,645,729, hereby incorporated by reference.

Typical suitable liquid crystalline current effects include, for example, dynamic scattering of nematics and mixtures of nematics and cholesterics, and diffuse scattering, as disclosed in U.S. Pat. Nos. 3,592,527; 3,722,998 and 3,761,172, hereby expressly incorporated by reference. Speaking generally, such liquid crystalline materials comprise nematic mesophases lacking memory and mixtures of nematic and cholesteric emsophases having memory wherein an applied voltage causes the selective diffusing and scattering of selectively transmitted and reflected light.

Generally speaking, these afoementioned liquid crystalline effects are obtained in the electro-optic device of FIG. 1 wherein, typically, (1) the photoconductor has a dark resistance sufficiently greater than that of the liquid crystalline material so that the electrical field which resides across the liquid crystalline material in the dark is below that required for imaging, and (2) in the presence of light, the resistance of the photoconductor is decreased to a value sufficiently low so that the voltage increase produced across the liquid crystalline material is sufficient to produce the effect.

Inasmuch as the materials, device components and conventional imaging methods are known to those skilled in the art, they will not be herein described in detail.

Figure 1:
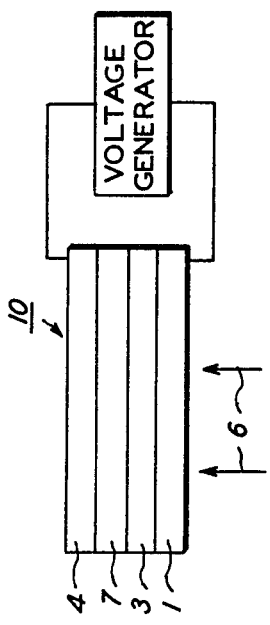
FIG. 1 is a schematic illustration of a typical device which comprises a photoconductive layer in contact with a liquid crystalline layer having a threshold voltage level of response.

In FIG. 1 is seen the electro-optic device 10 comprising a photoconductive layer 3 and liquid crystalline layer 7, both sandwiched between electrodes 1 and 4, the electrodes in electrical connection with a voltage source. Preferably, a polymeric adhesive such as phenoxy resin is used between layer 3 and electrode 1 to promote mechanical compatibility.

Details of materials components and parameters are given in the aforementioned patents. Generally speaking, electrodes 1 and 4 may comprise any suitable material which allows the provisioning of a voltage across liquid crystalline layer 7 and photoconductive layer 3. Typical suitable materials include metals such as platinum, silver, tin, aluminum, gold, copper, indium, gallium; conductive metal oxides such as, for example, tin oxide, indium oxide; insulating substrates coated with conductive layers such as NESA glass comprising a thin coating of tin oxide over glass and commercially available from Pittsburgh Plate and Glass Company. Any suitable electrode material can be utilized.

Photoconductive layer 3 may comprise any suitable photoconductive material. Typical suitable photoconductive materials include photoconductive inorganic materials and photoconductive organic materials. Typical suitable inorganic photoconductive materials include sensitized zinc oxide, for example, sensitized by the addition of Rodamine Dye, available from Dupont, selenium, selenium alloyed with arsenic such as, for example, arsenic triselenide, tellurium, antimony or bismuth; cadmium sulfide, cadmium sulfoselenide, and the many other typical suitable inorganic photoconductive materials listed in U.S. Pat. No. 3,121,006 to Middleton et al and listed in U.S. Pat. No. 3,288,603, both of which patents are hereby incoporated by reference. Typical suitable organic photoconductive materials include, for example, the combination of 2,5-bis(p-aminophenyl)-1,3,4-oxadiazole available under the trademark TO 1920 from Kalle and Company, Weisbaden-Biebrich, Germany and Vinylite VYNS, a copolymer of vinyl chloride and vinyl acetate, available from Carbide and Carbon Chemicals Company; and the combination of 2,4,7-trinitro-9-fluorenone to polyvinylcarbazole, available under the trademark Luvican 170 from Winter, Wolf and Company, New York, N.Y. The thickness of the photoconductive layer 3 is not critical to the practice of the invention and any thickness which provides a sufficiently high dark resistance may be utilized. That is, the dark resistance should be sufficient to provide greater voltage across the photoconductive layer than across the liquid crystal layer in the dark. Then, when struck by actinic light 6; the voltage decreases across the photoconductive layer 3 and increases across the liquid crystalline layer 7.

Actinic light 6 can be in imagewise configuration. Alternatively, electrodes 1 and 4 can be in imagewise configuration in which case actinic light 6 can uniformly impinge photoconductive layer 3.

Liquid crystalline layer 7 can conveniently be any suitable layer of material or combination of materials. For example, layer 7 ca be a liquid crystalline composition which exhibits dynamic scattering in the areas of current flow. In this case, the configuration of the current flow from the photoconductor and through the liquid crystalline material of layer 7 which exhibit dynamic scattering. Electrodes 1 and 4 can be shaped in image configuration in order to provide imagewise configured photocurrent; or alternatively, the actinic light can be in imagewise configuration thereby causing the photocurrent to be exhibited in portions of layer 7 corresponding to the portions of photoconductive layer 3 struck by the excitation light.

Further, layer 7 can be a liquid crystalline composition which exhibits phase transition, texture transformation, or optical uniaxiality change to biaxiality, or any of the other known liquid crystalline compsitional effects exhibited in response to a threshld voltage.

Any suitable combination of thicknesses for photoconductive layer 3 and liquid crystalline layer 7 can be utilized. These thicknesses are not critical. Typically, a thickness of from about 1 micron to about 100 microns is preferred for liquid crystalline layer 7 because enhanced contrast and resolution of images are obtained in this range. When a thickness for layer 7 is within this range, the photoconductor is preferably from about 1 micron to about 100 microns thick.

These thicknesses are preferred because, generally speaking, resolution of images increases with decreasing liquid crystalline layer thickness and is les objectionable within the liquid crystalline layer thickness range of from about 1 micron to about 100 microns than outside this range. For photoconductive layer 3, thicknesses below about 1 micron normally produce excessive dark current and greater than about 100 microns produce impedance in the photoconductive layer which make it inconvenient to obtain the desired voltage decrease across layer 3 and the desired voltage increase across layer 7 when actinic light strikes the photoconductive layer 3.

The voltage source may be either a D.C. voltage source or an A.C. voltage source. Typically, D.C. voltages are applied during imaging with A.C. voltages of a frequency of about 1 to about 20 KHz applied for erasure.

Figure 2:
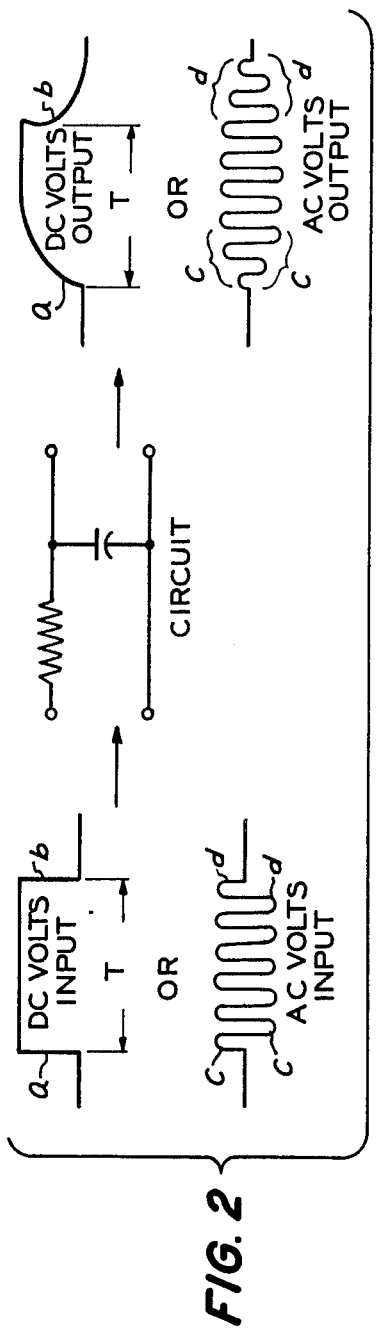
FIG. 2 is a schematic illustration of one embodiment of the voltage generator in FIG. 1.

One embodiment of the voltage generator of FIG. 1 is schematically illustrated in FIG. 2 as producing a shaped voltage or one having a curvilinear, stretched out rise time and removal time. Either or both the rise time and removal time voltage is used in accordance with the practice of this invention. The FIG. 2 voltage generator can be used to produce either a D.C. or A.C. shaped voltage depending upon the voltage source input. The D.C. voltage input turn-on, $a$, and turn-off, $b$, is substantially instantaneous. Similarly, the A.C. voltage input turn-on, $c$, and turn-off, $d$, is substantially instantaneous. The circuit stretches out the turn-on and turn-off times in a curvilinear fashion as depicted by the portions $a$, $b$, $c$, $d$, of the D.C. and A.C. voltage output curves of FIG. 2. These output voltages are utilized in accordance with the practice of this invention in order to keep the voltage across the liquid crystalline layer below the threshold level of response of the liquid crystalline layer during turn-on and turn-off of applied voltages. This prevents undesired response by the liquid crystalline layer. The output voltage is equal to $V_0(1 - e^{-t/\tau})$ where $V_0$ = maximum voltage input, e = natural constant, $t$ = time and $\tau$ = the circuit time constant (R × C, where R = resistance and C = capacitance of the circuit). For $t$ much greater than $\tau$ the voltage is equal to $v_o$. The duration of the input voltage, T, should be the order of at least five times the circuit time constant, $\tau$, in order for the maximum voltage output $v_o$ to be reached.

Figure 3:
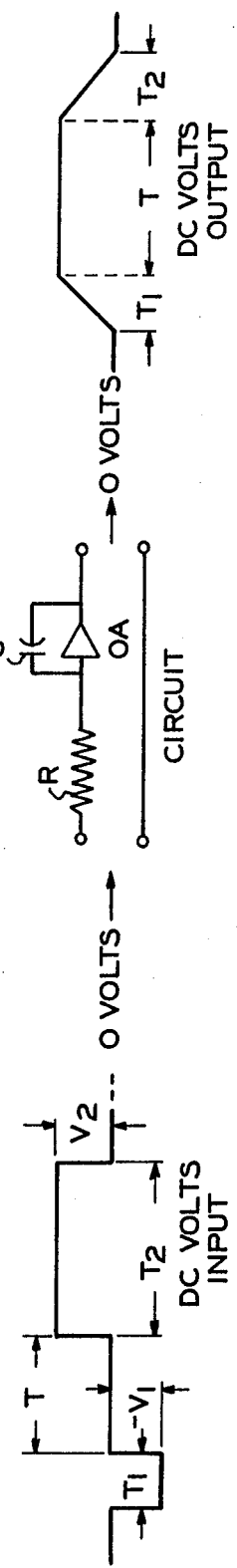
FIG. 3 is a schematic illustration of another embodiment of the voltage generator in FIG. 1.

Another embodiment of the voltage generator of FIG. 1 is schematically illustrated in FIG. 3. Here the voltage source is a variable polarity D.C. voltage source providing a D.C. voltage input. The embodiment of FIG. 3 allows for the independent control of the duration of the turn-on and turn-off times of applied voltage which turn on and turn off portions of the voltage are in the form of a ramp voltage; i.e., linearly ascending and linearly descending in time. The voltage input shape can be provided by either a switch or a waveform generator. Typically, a three position switch is utilized in which one switch position provides the negative $V_1$ input voltage for a period of time $T_1$ which corresponds to the turn-on time of the output voltage; a second switch position reduces the input voltage to zero during time period T of maximum output voltage; and a third switch position provides the positive input voltage $V_2$ for a period of time $T_2$ which corresponds to the turn-off time of the output voltage. The circuit comprises a resistor R, a capacitor C and an operational amplifier OA as depicted in FIG. 3. The output voltage is determined by the equation $$V_{output} = - \frac{1}{RC} \int V_{input} dt.$$

Thus, it will be appreciated that the continuously horizontal portion of the voltage output depicted in FIG. 3 returns to zero when $V_1T_1 = V_2T_2$. Preferably, though not necessarily, the continuously horizontal magnitude portion of the output voltage is obtained in order to have an unvarying steady state voltage division of the output voltage between the photoconductive layer and the liquid crystalline layer. This provides greater control of the imaging process and permits cyclic imaging with repetitive parameter settings.

Figures 4, 6:
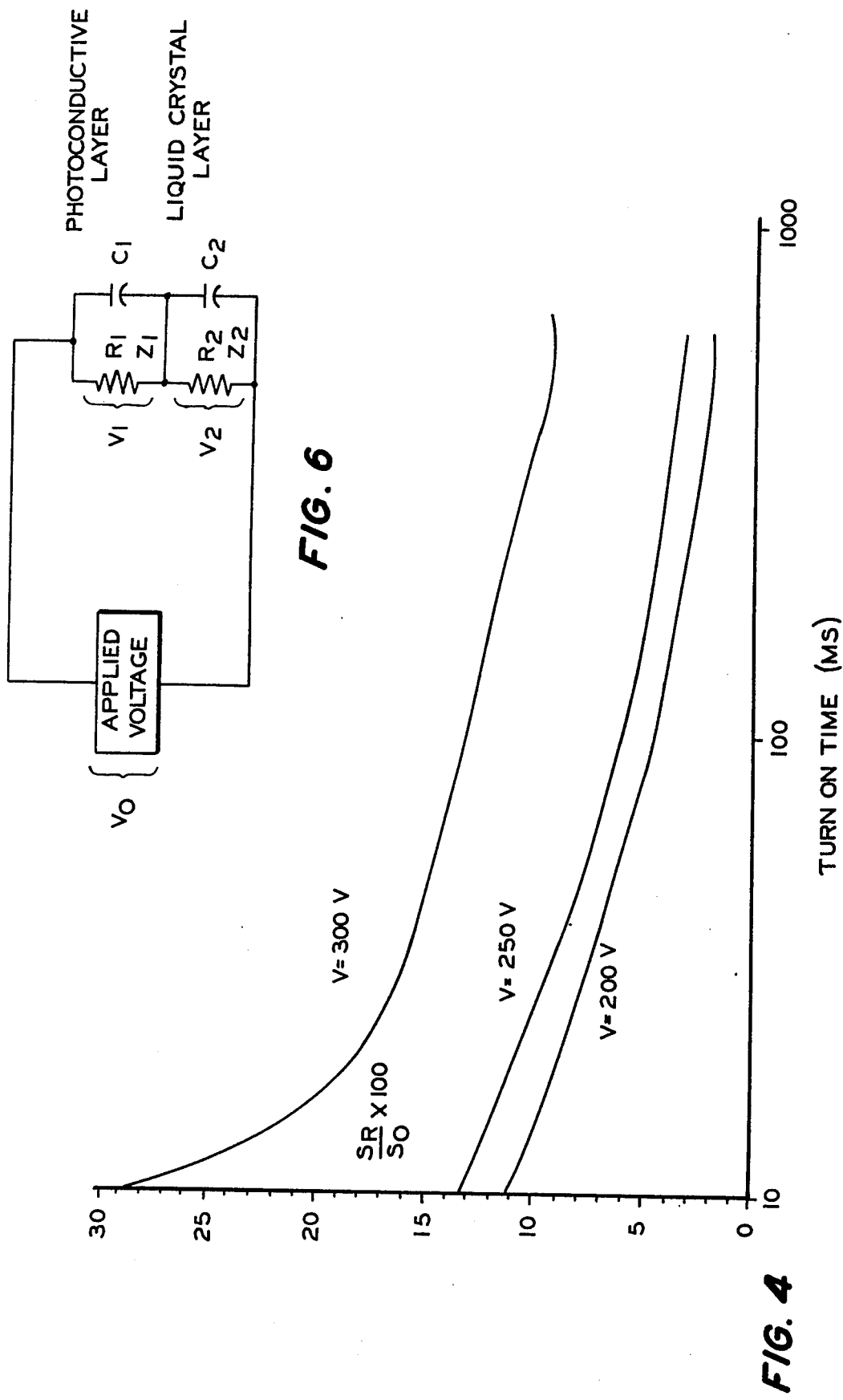
FIG. 4 is a graphical illustration of percentage of premature response versus turn-on time of applied voltage for an embodiment of the invention.
FIG. 6 is a schematic illustration of the electrical analog of the electro-optic device of FIG. 1.

FIG. 4 schematically illustrates the results obtained in accordance with the practice of the invention for the application of D.C. voltages to the devices of FIG. 1 having a liquid crystalline layer comprising by weight 80% p-methoxybenzylidene-p-n-butylaniline (MBBA)

and 20% cholesteryl oleyl carbonate (COC) utilizing the voltage generator of FIG. 3. A Tektronix Type 162 waveform generator supplies variable polarity D.C. voltage to a Tektronix Type O Operational Amplifier in the circuit of FIG. 3.

In FIG. 4, the scattering of light due to complete texture transformation of the liquid crystalline layer is denoted by $S_o$.

The percent of maximum scattering due to the degree of Grandjean to focal-conic texture transformation is equal to $(S_R/S_o) \times 100$, where $S_R$ is the residual scattering measured at about 0.3 sec. after turn-on of the applied voltage (i.e., 0.3 sec after the passage of $T_1$ in the voltage output graph of FIG. 3). Typically, 0.3 sec after $T_1$ is sufficient to allow the system time constants to relax the system into the aforementioned steady state voltage division.

In order to insure that the percent of scattering is indicative of the percent of texture transformation, the magnitude of applied voltage is chosen to yield a steady state voltage division which results in a voltage level across the liquid crystalline layer that is insufficient to cause scattering and which is below the threshold voltage for dynamic scattering.

Thus, plotted on the Y axis of Fig. 4 is $S_R/S_o \times 100$. Plotted on the X axis of FIG. 4 is the turn-on time of the voltage applied to the electro-optic device of FIG. 1. This turn-on time is the time $T_1$ in the voltage output graph of FIG. 3 and is generally defined as the rise of time of the applied voltage.

A review of FIG. 4, then, clearly demonstrates that (1) the longer the turn on time the less the percentages of scattering and hence texture transformation; and (1) higher voltages can be applied over longer turn-on times and result in less texture transformation than lower voltages applied over shorter turn-on times. This applies to turn-off times as well.

The significance of being able to decrease the percentage of texture transformation in memory devices is self-evident. The significance of being able to utilize higher voltages such as 300 volts rather than 200 volts is that the optical sensitivity of the electro-optic device increases with increasing voltage applied to the device. This can be seen in FIG. 5 which illustrates experimental measurements of image optical density versus exposure when, during imaging under applied voltage, the photoconductor is exposed to actinic light.

FIG. 6 schematically illustrates the electrical analog of the electro-optic device of FIG. 1. The photoconductive and liquid crystalline layers are respectively labeled and have resistances, (R); capacitances (C) and impedances (Z).

The voltage division of the device upon the conventional substantially instantaneous application of A.C. or D.C. voltage is initially capacitance in nature and is, for the photoconductive layer, $$V_1 = \frac{V_0 C_2}{C_1 + C_2}$$

and for the liquid crystal layer $$V_2 = \frac{V_0 C_1}{C_1 + C_2}$$

This is herein referred to as the transitory voltage division and changes with a relaxation time $$\frac{R_1 R_2 (C_1 + C_2)}{R_1 + R_2}$$

to the steady state division which, for D.C. voltages, becomes $$V_1 = \frac{V_0 R_1}{R_1 + R_2}$$

for the photoconductor and $$V_2 = \frac{V_0 R_2}{R_1 + R_2}$$

for the liquid crystalline layer. For A.C. voltages, the steady state division is $$V_1 = \frac{V_0 Z_1}{Z_1 + Z_2}$$

for the photoconductor, and $$V_2 = \frac{V_0 Z_2}{Z_1 + Z_2}$$

for the liquid crystalline layer. The transitory voltage division can result in a voltage across the liquid crystalline layer which exceeds the voltage threshold of response of the liquid crystalline layer and causes the premature response of a significant percentage of the liquid crystalline layer. This invention significantly reduces the amount of premature response while providing increased sensitivity to the electro-optic device.

The following Examples further specifically illustrate various preferred embodiments of the present invention. Parts and percentages are by weight unless otherwise indicated.

EXAMPLE I

The electro-optic device of FIG. 1 is prepared as follows. Electrodes 1 and 4 are obtained from the Optical Coating Laboratory Company and comprise a coating of indium oxide on a glass substrate. The electrodes are about two inches square in area. An about 60A thick phenoxy resin layer is placed on one electrode in contact with the indium oxide; the phenoxy layer is overcoated with an about 7.4 micron thick arsenic triselenide layer. An about 13 microns thick Mylar spacer is sandwiched between the arsenic triselenide layer and the second electrode. A liquid crystalline composition comprising a mixture of about 80% by weight MBBA and about 20% by weight COC is allowed to fill the gap between the second electrode and arsenic triselenide layer by capillary action.

Non-actinic light of about 1 micron wavelength to which the arsenic triselenide is transparent is passed through the device from the arsenic triselenide side and directed upon a photodiode.

A square pulse of D.C. voltage having a rise time of less than one microsecond and a magnitude of about 200 volts is applied across the device with positive polarity of the voltage applied to the electrode nearest the arsenic triselenide. A partial texture transformation was observed as detected by a significant reduction in the light reaching the photodiode.

When the same voltage was applied by linearly increasing from 0 to about 200 volts over a period of time of about one second, no texture transformation was observed as indicated by the amount of light reaching the photodiode.

EXAMPLE II

Example I is repeated for voltage magnitude ranging from about 200 volts D.C. to about 300 volts D.C. with rise times (turn-on times) varying from about 10 milliseconds to about one second. The results obtained are schematically illustrated in FIG. 4. The ratio of the decrease of the photodiode signal to the maximum photodiode signal is plotted as a function of rise time.

EXAMPLE III

Example I is repeated except that the voltage was applied by linearly increasing from 0 to about 200 volts over a period of time of about one second. No texture transformation was observed.

The applied voltage is reduced to 0 in a time less than one microsecond. A partial texture transformation is observed.

EXAMPLE IV

Example III is repeated except that the applied voltage is reduced to 0 volts over a time period of about one second. No texture transformation is observed.

EXAMPLE V

Example I is repeated except that the arsenic triselenide layer is about 10 microns thick and has a dark resistivity of $10^{13}$ ohm-cm and a dielectric constant of about 8. The liquid crystalline layer comprises a typical dynamic nematic liquid crystalline material having a resistivity of about $5 \times 10^9$ ohm-cm, a dielectric constant of about 2 and is about 10 microns thick.

An about 100 volts D.C. voltage is applied with a rise time of about 1 microsecond. Dynamic scattering is observed momentarily for a few milliseconds.

EXAMPLE VII

Example V is repeated and the applied voltage is reduced to 0 in a time period of about 1 microsecond. Dynamic scattering is observed momentarily for a few milliseconds.

EXAMPLE VIII

Example VI is repeated and the applied voltage is reduced to zero in a time period of about 0.4 second. No dynamic scattering is observed.

EXAMPLE IX

Example V is repeated except that the arsenic triselenide layer is about 50 microns thick and the voltage is applied as an A.C. voltage having a frequency of 50 Hz and a magnitude of 40 volts rms which is achieved in a time period of about one microsecond. Dynamic scattering is momentarily seen.

EXAMPLE X

Example IX is repeated except that the magnitude of the A.C. voltage is increased over a time period of about 15 milliseconds to about 40 volts rms. No dynamic scattering is observed.

EXAMPLE XI

The electro-optic device of FIG. 1 is prepared according to the procedure of Example I except that a typical field-effect nematic is used as the liquid crystalline layer, having a resistivity of $10^{11}$ ohm-cm and a dielectric constant of about 2. The photoconductor has a dark resistivity of about $10^{14}$ ohm-cm and a dielectric constant of about 8. The nematic is homogeneously aligned. An about 100 volt D.C. voltage is applied with a rise time of about 1 microsecond. The nematic is transformed from the homogeneous alignment to the homeotropic alignment momentarily, with accompanying optical changes.

EXAMPLE XII

Repeating Example XI except that the voltage is applied with a rise time of about 8 seconds. No transformation of the nematic alignment is observed.

It will be understood that the above Examples describe the application and removal of voltages to provide the advantageous results of the present invention. The step of exposing the photoconductive layer to actinic radiation in order to image the liquid crystalline layer is conventional and known to those skilled in the art; therefore, the imaging exposure step has been omitted in the above examples.

Further, it will be appreciated that photoconductors having a fundamental absorption band in the X-ray portion of the spectrum, or in the ultra-violet or infrared portions of the spectrum can be employed. The radiation used will, of course, be radiation which is actinic to the photoconductor.

In conclusion, it should be noted that the components, parameters and materials for the electro-optic device can comprise any one of numerous combinations which meet the criteria of voltage division previously discussed. For example, if the voltage generator depicted in FIG. 3 is employed, one can easily select any one of numerous combinations which satisfy the expression $$\frac{\tau}{T}\left[1 - e^{-\frac{T}{\tau}}\right](V_C - V_R) + V_R < V_T$$

where $V_R$ is the voltage division across the liquid crystalline layer during steady state voltage division; $V_C$ is the voltage across the liquid crystalline layer during the transitory voltage division; $V_T$ is the threshold voltage of the liquid crystalline layer, $\tau$ is the relaxation time of the device and T is the rise time of the linearly increasing applied voltage. A similar expression for the voltage generator of FIG. 2 can be derived in which the voltage across the liquid crystalline layer meets the previously described voltage divisions behavior and still remains below $v_T$.

It will be appreciated that other variations and modifications will occur to those skilled in the art upon a reading of the present disclosure. These are intended to be within the scope of this invention.

For example, typical suitable liquid crystalline field-effects can be used and include, for example, the optically negative to optically positive phase transformation disclosed in U.S. Pat. No. 3,652,148 hereby incoporated by reference; the twisted nematic to nematic transformation disclosed in U.S. Pat. No. 3,731,986, hereby incorporated by reference; the Grandjean to focal-conic texture transformation disclosed in U.S. Pat. No. 3,642,348, hereby incorporated by reference; and, the nematic field-effects such as, for example, the uniaxial to biaxial transformation disclosed in U.S. Pat. No. 3,687,515, hereby incorporated by reference.

What is claimed is:

1. In a method of imaging an electro-optic device of the type having two electrodes sandwiching a photoconductive layer in contact with a liquid crystalline layer wherein the liquid crystalline layer is capable of undergoing an optical property change in response to a threshold voltage across the liquid crystal layer upon exposure of the photoconductor to active radiation and wherein upon substantially instantaneous application or removal of a desired voltage magnitude between the two electrodes the voltage division between the photoconductive layer and the liquid crystalline layer is such that the voltage magnitude across the liquid crystalline layer transitorily exceeds the threshold voltage magnitude required across the liquid crystalline layer for optical property change in the liquid crystalline layer, the improvement for reducing change of optical property in the liquid crystalline layer prior to exposure of the photoconductive layer comprising the step of applying the voltage magnitude between the two electrodes over a voltage magnitude rise time sufficient to maintain the voltage across the liquid crystalline layer at a magnitude below the threshold voltage required across the liquid crystalline layer for optical property change.

2. The method of claim 1 further including the step of exposing the photoconductive layer to actinic radiation whereupon the voltage across the liquid crystalline layer exceeds the threshold voltage required across the liquid crystalline layer for optical property change.

3. The method of claim 2 further including the step of reducing the voltage applied between the two electrodes to zero over a period of time sufficient to maintain the voltage across the liquid crystalline layer at a magnitude below the threshold voltage required across the liquid crystalline layer for optical property change.

4. The method of claim 1 wherein said actinic radiation is in imagewise configuration.

5. The method of claim 1 wherein at least one of said first and second electrodes is in imagewise configuration.

6. The method of claim 1 wherein said liquid crystalline layer comprises a liquid crystalline composition comprising a mixture of a cholesteric liquid crystalline material and a nematic liquid crystalline material.

7. The method of claim 1 wherein said applied voltage is applied as a shaped voltage.

8. The method of claim 1 wherein said applied voltage is applied as a ramp voltage.

9. The method of claim 1 wherein said applied voltage is a D.C. voltage.

10. The method of claim 1 wherein said optical property change comprises a texture transformation.

11. The method of claim 1 wherein said optical property change comprises an optically negative to optically positive phase transformation.

12. The method of claim 1 wherein said optical property change comprises dynamic scattering.

13. The method of claim 1 wherein said optical property change comprises uniaxial to biaxial transformation.

14. The method of claim 1 wherein said photoconductive layer is from about 1 micron to about 100 microns thick.

15. The method of claim 1 wherein said liquid crystalline layer is from about 1 micron to about 100 microns thick.

* * * * *